United States Patent
Blakemore et al.

(10) Patent No.: US 6,878,309 B2
(45) Date of Patent: Apr. 12, 2005

(54) CONTROLLED RELEASE COOLING ADDITIVE COMPOSITION

(75) Inventors: Thomas J. Blakemore, Flossmoor, IL (US); Yu-Sen Chen, Naperville, IL (US)

(73) Assignee: Dober Chemical Corp., Midlothian, IL (US)

(*) Notice: Subject to any disclaimer, the term of this patent is extended or adjusted under 35 U.S.C. 154(b) by 305 days.

(21) Appl. No.: 09/781,842

(22) Filed: Feb. 12, 2001

(65) Prior Publication Data

US 2002/0153505 A1 Oct. 24, 2002

(51) Int. Cl.$^7$ .............. C02F 5/02; A01N 25/34; A01N 25/26
(52) U.S. Cl. .............. 252/181; 252/176; 428/402.24; 428/407; 424/405; 424/408; 514/963
(58) Field of Search .............. 428/402.24, 407; 252/181, 176; 424/405, 408; 514/963

(56) References Cited

U.S. PATENT DOCUMENTS

| | | | |
|---|---|---|---|
| 3,094,133 A | | 6/1963 | Treanor |
| 3,242,051 A | * | 3/1966 | Hiestand et al. ......... 264/4.3 X |
| 3,505,244 A | * | 4/1970 | Cessna ....................... 252/391 |
| 3,615,024 A | * | 10/1971 | Michaels ................... 210/490 |
| 3,646,178 A | * | 2/1972 | Traubel et al. ............. 524/507 |
| 3,754,741 A | | 8/1973 | Whitehurst .......... 261/DIG. 11 |
| 3,852,224 A | * | 12/1974 | Bridgeford ................. 521/149 |
| 3,853,601 A | * | 12/1974 | Taskier .................... 428/315.7 |
| 3,911,193 A | * | 10/1975 | Resz et al. .................. 428/407 |
| 3,960,757 A | * | 6/1976 | Morishita et al. ... 428/402.24 X |
| 3,977,992 A | | 8/1976 | Hofacker |
| 4,561,981 A | * | 12/1985 | Characklis ............. 252/180 X |
| 4,673,527 A | | 6/1987 | Goudy, Jr. et al. .......... 252/181 |
| 4,692,314 A | * | 9/1987 | Etani .......................... 422/265 |
| 4,717,495 A | | 1/1988 | Hercamp et al. ............. 252/75 |
| 4,728,452 A | | 3/1988 | Hansen ......................... 252/75 |
| 4,738,897 A | * | 4/1988 | McDougall et al. .... 252/181 X |
| 4,756,844 A | | 7/1988 | Walles et al. ........ 428/402.24 X |
| 5,050,549 A | | 9/1991 | Sturmon ............... 134/22.14 X |
| 5,089,041 A | | 2/1992 | Thompson et al. ......... 71/64.11 |
| 5,120,349 A | | 6/1992 | Stewart et al. ...... 428/402.24 X |
| 5,186,732 A | | 2/1993 | Thompson et al. ......... 71/64.11 |
| 5,337,705 A | | 8/1994 | Lane ............................ 123/41 |
| 5,407,594 A | | 4/1995 | Fry et al. |
| 5,472,712 A | * | 12/1995 | Oshlack et al. ......... 424/408 X |
| 5,565,106 A | | 10/1996 | Sherbondy et al. ......... 210/700 |
| 5,585,050 A | * | 12/1996 | Jorda et al. ............. 424/405 X |
| 5,643,351 A | | 7/1997 | Lew et al. .................. 71/64.13 |
| 5,662,803 A | | 9/1997 | Young ......................... 210/698 |
| 5,670,059 A | * | 9/1997 | Jones et al. ............. 252/181 X |
| 5,741,433 A | * | 4/1998 | Mitchell et al. ........ 428/407 X |
| 6,010,639 A | | 1/2000 | Mitchell et al. ............. 252/176 |
| 2003/0053927 A1 | * | 3/2003 | Drozd et al. ................. 422/14 |

OTHER PUBLICATIONS

Copy of related U.S. Appl. No. 09/539,914, filed Mar. 31, 2000.

* cited by examiner

*Primary Examiner*—Daniel S. Metzmaier
(74) *Attorney, Agent, or Firm*—Stout, Uxa, Buyan & Mullins, LLP; Frank J. Uxa

(57) ABSTRACT

A controlled-release additive composition for use in aqueous systems. The composition comprises a core containing at least one additive component and a polymeric coating encapsulating said core. The controlled released cooling additive composition slowly releases the additive components to aqueous system, thereby delivering an effective concentration level of additive components over an extended period.

19 Claims, No Drawings

CONTROLLED RELEASE COOLING ADDITIVE COMPOSITION

FIELD OF THE INVENTION

The present invention relates to a controlled-release additive composition for use in aqueous systems, particularly cooling systems, and to a method of using said additive compositions. The controlled release additive composition comprises a water-soluble core containing at least one water treatment chemical and a polymeric coating material encapsulating said core which slowly releases the water treatment chemical into the aqueous system, thereby delivering an effective level of the water treatment chemical to the aqueous system over an extended period.

BACKGROUND OF THE INVENTION

Traditionally, additives such as anti-foulants, anti-scaling agents, corrosion inhibitors, buffering and pH agents, microbiocides and the like are added directly to the solutions of aqueous systems as needed to prevent scale deposition, corrosion of metal surfaces and similar fouling of the aqueous systems, as well to maintain proper pH levels. As used herein, an aqueous system may include, without limitation, a cooling system, an open circulating cooling water system and an engine cooling system. Also, as used herein, a "system" includes at least a circulating solution. For example, a system may include a circulating solution, pump, tubing, etc.

In certain aqueous systems, it is important to maintain a steady level of additives. For example, the presence of microbiocides is especially important in an aqueous system such as cooling systems employed in cooling towers. Cooling towers usually maintain a cooling system for a considerable length of time. Typically, such cooling systems do not have sufficient aeration and exposure to sunlight to prevent microbial, especially bacterial and fungal, growth. In particular, many cooling systems use fill composed of beads of synthetic polymer or other materials, in order to extend the amount of heat exchange surface area. This type of construction greatly aggravates the problem of microbiological growth, since it provides an ideal physical environment for the propagation of troublesome microbes. If left untreated, such microorganisms may flourish and produce colonies extensive enough to give rise to problems of biofilm blockage of heat exchange surfaces, as well as clogging of the components of the water transporting apparatus used in operating the aqueous system.

Various methods of introducing additive to an aqueous system have been developed. For instance, a solid additive material may be added directly to the aqueous system which dissolves in the aqueous system. However, this method cannot maintain a steady concentration level of additive within the system. Initially, there would be a high level of the additives released into the system, and within a short time the additives are depleted. Additionally, a significant draw back of this method is the danger of overdosing the system with particular additives which are initially released. The overdosing is dangerous in that it can result in erosion and corrosion problems.

Minimal attempts have been made in the prior art to address particular water treatment systems by using controlled release coatings. For example, Characklis in U.S. Pat. No. 4,561,981 (issued Dec. 31, 1985) disclosed a method for controlling, preventing or removing fouling deposits, particularly in pipelines, storage tanks and the like by microencapsulating fouling control chemicals in a slow release coating. The coating material is described as being any material compatible with the fouling control chemical which is capable of sticking to the fouling deposit site. However, the coating materials as disclosed by Characklis may dissolve in a cooling system and create further corrosion problems.

Recently, Mitchell et al. in U.S. Pat. No. 6,010,639 disclosed that a terpolymer may be used as a coating for cooling additives.

However, despite the efforts of the prior art, a need still exists for a controlled release cooling treatment composition.

SUMMARY OF THE INVENTION

Accordingly, the present invention provides a controlled release additive composition for aqueous systems. This invention provides for delayed and more effectively complete release of additive components. Such release helps maintain a consistent level of additive components in the aqueous system over an extended period of time. Preferably, the additive components comprise additives. As used herein, the term "additive" includes all materials which can be compounded or admixed with the additive compositions and which impart beneficial properties to the aqueous system. For example, an additive may comprise a microbiocide that is compatible with aqueous systems.

More particularly, the present invention provides a controlled release additive composition for cooling systems, preferably open circulating cooling water system.

In one embodiment, a controlled release cooling composition has a core containing a water-soluble cooling additive component and a coating substantially surrounding the core.

In a preferred embodiment, the coating is a polymer made up of units from no more than two monomers. More preferably, the units include vinylacetate and vinyl versatate.

The additive component has at least one active ingredient selected from the group consisting of microbiocides, buffering components, captivation liner pitting inhibitors, metal corrosion and hot surface corrosion inhibitors, defoaming agents, hot surface deposition, scale inhibitors, dispersant agents, surfactants and mixtures thereof.

In a preferred embodiment, the additive component also includes sodium nitrite, sodium nitrate and sodium molybdate.

Each and every feature described herein, and each and every combination of two or more of such features, is included within the scope of the present invention provided that the features included in such a combination are not mutually inconsistent.

DETAILED DESCRIPTION OF THE INVENTION

The present invention relates to controlled release additive compositions for use in aqueous systems. Preferably the aqueous system is a cooling system, more preferably circulating cooling water system, even more preferably open circulating cooling water systems. In one embodiment, the additive compositions are used in engine circulating cooling water systems. In a preferred embodiment, the additive compositions are used in an open circulating cooling water system of cooling towers.

The controlled release additive composition comprises a core containing a water-soluble additive component and a coating encapsulating said core which enables the slow release of the additive component into the open circulating cooling water system. Any type of coating conventionally known in the art which provides controlled-release properties may be used in the present invention.

In a preferred embodiment, the coating is a polymer dispersion. More preferably, the polymer dispersion has the following properties:

1. Low viscosity: The polymer dispersion should be of a low to medium viscosity. When the viscosity is too high, it would become impossible to pump the polymer dispersion through a coating system. This would cause the line and spray gun to become plugged. Also, in this case, the droplets of polymer dispersion would be too thick and difficult to lose moisture. They would not have the desired level of dryness before they reach the tablet surface. Therefore, the polymer would not form a good and homogeneous coating.

It should be noted that reducing the viscosity of a polymer dispersion through dilution with water is not always a viable solution. Often the dilution leads to changes of physical properties for the polymer dispersion and renders the polymer not appropriate for coating applications.

2. Low film forming and glass transition temperatures: Every polymer has its own characteristic film forming temperature and glass transition temperature, $T_g$. To form a good coating, the polymer must have a film forming temperature lower than the operating temperatures inside the chamber of the drum coater in the coating process. A high $T_g$ would lead to a brittle and fragile film which may easily peel off. Generally, a polymer with lower film forming temperature and $T_g$ forms better film than those polymers with higher corresponding temperatures.

3. Good film forming ability onto tablet surface: In the early stage of coating process, the polymer has to have good adherence to the tablet surface, so that the coating film can gradually build up. The polymer particles should pack well without large spaces or holes in between. This can be examined and confirmed under a microscope. Typically the polymer with small particle size will result in better packing. Also, the polymer must possess good elasticity; otherwise, the coating would crack, especially upon cooling.

4. Insolubility of the polymer in an operating aqueous system: Typically, an operating aqueous system, has high temperatures. For example, an operating open circulating cooling water system is about 70 degrees F. to about 150 degrees F., preferably about 80 degrees F. to about 100 degrees F., more preferably about 90 degrees F. to about 95 degrees F. The polymer coatings should be able to remain insoluble and stable in these systems. If the polymer coating dissolves, it will lose the slow release function.

5. Stability of polymer coating in solutions of aqueous systems under operating conditions: Many polymers degrade because they undergo alkaline hydrolysis reaction in operating aqueous system conditions. As degradation or dissolution occurs, the coating is damaged. As a result, the coating forms holes and loses the control of slow release. Subsequently, all chemical ingredients rapidly enter the bulk cooling.

Without wishing to limit the invention to any particular mechanism or theory of operation, it is believed that the release of ingredients from the tablet core into the bulk cooling solution involves three steps: (a) cooling solution enters the inner tablet core through the polymer coating, (b) chemical ingredients of the tablet dissolve in contact with cooling and (c) the resulting highly concentrated solution diffuses through the polymer coating back into the bulk cooling. The path and size of channels, microscopically, within the polymer coating, which are characteristics of each specific polymer and are closely related to the physical properties of each polymer in cooling solutions at elevated temperatures, control the kinetics of these actions.

In one embodiment, film forming polymers are found to have these desired properties. Suitable film forming polymers include, for example, homopolymers, copolymers and mixtures thereof, wherein the monomer units of the polymers are preferably derived from ethylenically unsaturated monomers, for example, two different such monomers.

A particularly useful ethylenically unsaturated monomer is compound I with the formula $(R_1)(R_2)(R_3)C-COO-(CH=CH_2)$, wherein $R_1$, $R_2$ and $R_3$ are saturated alkyl chains. In one embodiment, $R_3$ of compound I is $CH_3$, and $R_1$ and $R_2$ of compound I have a total of about 2 to about 15 carbons; such a molecule is also known as a vinylversatate. In a preferred embodiment, $R_3$ is $CH_3$, and $R_1$ and $R_2$ have a total of about 5 to about 10 carbons. In a more preferred embodiment, $R_3$ is $CH_3$, and $R_1$ and $R_2$ have a total of 7 carbons., i.e. $R_1+R_2=C_7H_{16}$.

In another embodiment, each of the $R_1$, $R_2$, and $R_3$ of compound I is a single chemical element. For example, the element may be a halogen, preferably a chloride. More preferably, the element may be a hydrogen. Compound I having a hydrogen as the element for $R_1$, $R_2$ and $R_3$ is known as vinylacetate.

In another embodiment, $R_1$ of compound I may be a single chemical element, and $R_2$ of compound I may be a saturated alkyl chain.

Other examples of ethylenically unsaturated monomers include: Monoolefinic hydrocarbons, i.e. monomers containing only carbon and hydrogen, including such materials as ethylene, ethylcellulose, propylene, 3-methylbutene-1, 4-methylpentene-1, pentene-1, 3,3-dimethylbutene-1, 4,4-dimethylbutene-1, octene-1, decene-1, styrene and its nuclear, alpha-alkyl or aryl substituted derivatives, e.g., o-, or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethylhexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, ally alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenonitrile, crotononitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like. Other useful ethylenically unsaturated monomers are styrene, methyl methacrylate, and methyl acrylate.

In one embodiment, the polymer forming the coating is made up of a copolymer of vinylacetate and vinylversatate. In a preferred embodiment, about 45% to about 95% by weight of the units are from vinylacetate and about 5% to about 55% by weight of the units are from vinylversatate. In more preferred embodiment, about 65% by weight of the units are from vinylacetate and about 35% by weight of the units are from vinylversatate.

In one preferred embodiment, the vinylversatate used is sold under the trademark VEOVA 10 sold by Shell Chemicals. In a particularly preferred embodiment, the water-based emulsion polymer is a vinylacetate-vinylversatate copolymer, sold under the trademark EMULTEX VV575 sold by Harlow Chemical Co. (England). Additionally, a surfactant may also be added to stabilize the dispersion. In a preferred embodiment, the polymer solid in the dispersion is about 54% to about 56% by weight of active polymer solid.

EMULTEX VV575 is particularly advantageous because it meets all of the six requirements for a good coating as set forth above. That is, it (1) exhibits a viscosity low enough for coating processing without difficulties, for example about 500 to about 1,500 mPa·s (RVT 2-20 at 23° C.), (2) has a film forming temperature of 10 degrees C. and a glass transition temperature, $T_g$, of 11 degrees C., low enough for forming a good coating, (3) has a fine to medium particle size of 0.37 micron and forms an elastic coating, (4) is insoluble in coolings at operating engine conditions, (5) is stable in coolings at operating engine conditions and (6) gives excellent release rates for ingredients, preferably ingredients in DCA-4+ tablets. (DCA-4+ tablets are described in detail herein below.)

In one embodiment, a copolymer which may be used as a coating in accordance with this invention include acrylate-vinylversatate. NeoCAR 820 sold by Union Carbide is the preferred acrylate-vinylversatate copolymer used for forming coatings.

In one embodiment, a polymer forming a coating in accordance with this invention is made up of a copolymer of vinylacetate and ethylene. In a preferred embodiment, about 45% to about 95% by weight of the units are from vinylacetate and about 5% to about 55% by weight of the units are from ethylene. In more preferred embodiment, about 60% to about 80% by weight of the units are from vinylacetate and about 30% to about 40% by weight of the units are from ethylene. In an even more preferred embodiment, about 90% by weight of the units are from vinylacetate and about 10% by weight of the units are from ethylene. A controlled release additive composition of the present invention may advantageously comprise about 5% to about 15% of a vinylacetate-ethylene copolymer.

In a preferred embodiment, a copolymer comprising vinylacetate and ethylene may be purchased under the trade name AirFlex 410, sold by Air Products and Chemicals, Inc., Allen Town, Penn., U.S.A. Such copolymer preferably has a viscosity of about 250 to about 900 cps.

In another embodiment, the polymer for coating is made up of a homopolymer. In a preferred embodiment, the monomer unit of the homopolymer is ethylcellulose. In a more preferred embodiment, ethylcellulose used for forming coatings is purchased from Dow Chemical sold under the trademark ETHOCEL S10, S20, S100, and preferably S45.

Specific properties of the various ETHOCEL's are determined by the number of anhydrous units in the polymer chain (expressed by the molecular weight or the solution viscosity), and, the degree of ethoxyl substitution (expressed as the percent of hydroxyl group, —OH, in cellulose substituted by ethoxyl group, —$OC_2H_5$). The preferred ETHOCEL S45 has a solution viscosity of about 41 to about 49 cP and about 48 to about 49.9% ethoxyl content. The viscosity is for a 5% solution in 80/20 toluene/ethanol measured at 25 degrees C. in an Ubbelohde viscometer.

The additive component comprises a mixture of conventional inhibiting and buffering agents typically used in aqueous systems, preferably cooling systems, more preferably open circulating cooling water systems. In one embodiment, the additive component comprises (1) a buffering component to maintain a neutral or alkaline pH, including for example, alkali metal salts or sodium phosphates, borates and the like, (2) a cavitation liner pitting inhibitor component, including for example, alkali metal or sodium nitrites, molybdates and the like, (3) a metal corrosion and hot surface corrosion inhibitor component, including for example, alkali metal, salts of nitrates, nitrates and silicates, carboxylic acids, phosphonic acids, phosphonate, pyrophosphate, azoles, sulfonic acids, mercaptobenzothiazoles, metal dithiophosphates and metal dithiocarbonates (one particular corrosion inhibitor that has been found to be highly satisfactory and is preferred is a phenolic anti-oxidant, 4,4'-methylenebis (2,6-di-tertbutylphenol) that is commercially available under the trademark Ethyl 702 manufactured by Ethyl Corporation), and the like, (4) a defoaming agent component including for example, silicone defoamers, alcohols such as polyethoxylated glycol, polypropoxylated glycol or acetylenic glycols and the like, (5) a hot surface deposition and scale inhibitor component including for example, phosphate esters, phosphino carboxylic acid, polyacrylates, styrene-maleic anhydride copolymers, sulfonates and the like, (6) a dispersing component, including for example, non-ionic and/or anionic surfactants such as phosphate esters, sodium alkyl sulfonates, sodium aryl sulfonates, sodium alkylaryl sulfonates, linear alkyl benzene sulfonates, alkylphenols, ethoxylated alcohols, carboxylic esters and the like, (7) an organic acid, including for example adipic acid, sebacic acid and the like, (8) an anti-gel such as that disclosed by Feldman et al in U.S. Pat. No. 5,094,666, the content of which is incorporated in its entirety herein by reference (for example, such anti-gel additive comprises copolymers of ethylene and vinyl esters of fatty acids with molecular weight of 500–50,000; or Tallow amine salt of phthalic anhydride, used at 0.01–0.2%; or Tallow amine salt of dithio benzoic acid, used at 0.005–0.15%; or 4-hydroxy,3,5-di-t-butyl dithiobenzoic acid; or ethylene-vinylacetate copolymers) and/or microbiocides, preferably microbiocides used in open circulating cooling water systems of cooling towers, as disclosed by Sherbondy et al. U.S. Pat. No. 5,662,803, wherein the disclosures of which are incorporated in their entirety herein by reference.

Other additive components contain a mixture of one or more of the agents provided in the following Table 1. The possible functions identified are exemplary, not limiting.

TABLE 1

| COMPONENT | POSSIBLE FUNCTION | RANGE % |
| --- | --- | --- |
| Alkali metal or Ammonium phosphates | corrosion inhibitor/ buffering agent | 0–80 |
| Alkali metal or ammonium phosphonate | corrosion inhibitor/ buffering agent | 0–80 |
| Alkali metal or ammonium pyrophosphate | corrosion inhibitor/ buffering agent | 0–80 |
| Alkali metal or ammonium borate | corrosion inhibitor/ buffering agent | 0–80 |
| Alkali metal or ammonium nitrites | cavitation liner pitting/corrosion inhibitor | 4–60 |
| Alkali metal or ammonium molybdates | cavitation liner pitting/corrosion inhibitor | 4–60 |
| Alkali metal or ammonium nitrates | corrosion inhibitor | |
| Alkali metal or ammonium silicates | corrosion inhibitor | 0–40 |
| Alkali metal or ammonium salts of one or more neutralized dicarboxylic acids | corrosion inhibitor | 1–15 |
| Tolyltriazole | corrosion inhibitor | 1–15 |
| Dispersants (e.g. polyacrylic acid, phosphino carboxylic acid, phosphate esters, styrene-maleic anhydride copolymers, polmaleic acid, sufonates and sulfonate copolymers) | deposition and scale | 0–15 |
| Defoamers (e.g. silicones, polyethoxylated glycol, polypropoxylated glycol, acteylenic glycols) | foam inhibitor | 0–3 |

In one embodiment, the additive component includes nitrite compounds. In a preferred embodiment, the additive component includes a mixture of nitrite compounds and molybdate compounds to maintain a minimum concentration level of about 800 ppm of nitrite or a mixture of nitrite and molybdate in the cooling system, with the proviso that the minimum level of nitrite in the cooling system is about 400 ppm. Such additive is sold by Fleetguard under the trademark DCA-2+, which includes borate, silicate, organic acids, tolytriazole, scale inhibitors, surfactants and defoamers, in addition to nitrite and molybdate.

In a more preferable embodiment, the additive component includes a mixture of nitrite, nitrate and molybdate compounds. In a more preferred embodiment, the additive component comprises nitrite, nitrate, phosphate, silicate, borate, molybdate, tolyltriazole, organic acids, scale inhibitors, surfactants and defoamer. Such an additive is sold by Fleetguard under the trademark DCA-4+.

The additive component may be in solid, granular or particulate form provided that it does not decompose or melt at processing temperatures. Preferably, the additive component is molded in the form of a pellet or tablet which may have either a spherical or irregular shape. The additive pellet or tablet should be of sufficient size to provide the steady controlled release of the additive components into the cooling system over the desired period of time. Further, when the additive pellet or tablet is used in a filtering environment, it should be larger than the pores or orifices of the filter.

Generally, a spherical pellet or tablet should have a diameter on the order of from about 1/32" to about 5.0", preferably from about 2/32" to about 3", more preferably from about 1/8" to about 1/2", even more preferably about 3/8".

The formation of the additive component into a pellet or tablet is dependent upon the mixture of materials contained therein. For example, when the additive component contains a sufficient amount of a dispersing agent or a mixture of dispersing agents, the dispersing agent or mixture also may function as a binder, thereby allowing the component to be molded or compressed directly into the form of a pellet or tablet. If the additive component does not compact well, a binder must be added to the additive component in order to mold or compress it into a pellet or tablet. Suitable binders include, for example, polyvinyl pyrrolidone, sodium acrylate, sodium polyacrylate, carboxymethylcellulose, sodium carboxyinethylcellulose, corn starch, microcrystalline cellulose, propylene glycol, ethylene glycol, sodium silicate, potassium silicate, methacrylate/acrylate copolymers, sodium lignosulfonate, sodium hydroxypropylcellulose, preferably hydroxyethylcellulose, and water.

Preferably, the additive component to be molded or compressed into a pellet or tablet further comprises a die release agent. Suitable die release agents include, for example, calcium stearate, magnesium stearate, zinc stearate, stearic acid, propylene glycol, ethylene glycol, polyethylene glycol, polypropylene glycol, polyoxypropylene-polyoxyethylene block copolymers, microcrystalline cellulose, kaolin, attapulgite, magnesium carbonate, fumed silica, magnesium silicate, calcium silicate, silicones, mono-and dicarboxylic acids and corn starch.

To form a controlled release cooling additive composition, the polymeric coating may be applied to the additive composition core by spray coating, microencapsulation or any other coating technique well known to practitioners in the art. Preferably, the polymeric coating is an aqueous dispersion latex which is applied to the additive core pellet or tablet by drum or pan coating. The amount of coating to be applied to the additive core is dependent upon the desired controlled release characteristics of the resulting coated tablet or pellet. An increase in the amount of coating will result in a decrease of the rate of release of the additive component. Generally, the weight percent of the coating is from about 1.0 to about 40.0% based on the total weight of the additive tablet, preferably from about 2% to about 20% by weight even more preferably about 3% to about 15% by weight. For example, the coatings employed in a cooling tower are about 4% to about 10%, preferably about 8% by weight.

In one broad embodiment, a method is provided for maintaining an effective concentration of at least one additive component in an open circulating cooling water system. The method includes steps of placing the cooling additive composition, such as the ones described herein, in contact with the open circulating cooling water.

In one embodiment, a method is provided for maintaining an effective concentration of at least one additive component in an engine cooling system. Although the coated additive tablets or pellets may be introduced directly into the engine cooling system, such a delivery method can result in the polymeric coating itself fouling the system. In order to prevent the water insoluble polymeric coating from being introduced into the engine cooling system along with the additive, the coated tablets are placed within a filtering environment such that the filter can release the water-soluble additive component into the cooling system but trap and retain the larger particles of polymeric coating. An example of such a filter device is the WF2171 Cooling filter, sold by Fleetguard.

The following non-limiting examples illustrate certain aspects of the present invention.

EXAMPLE 1

Release Characteristics of a Controlled Release Cooling Additive Composition in a Flask The release characteristics of a controlled release cooling additive composition were tested in a flask. In particular, the coating used for the cooling additive composition tested was vinylacetate-vinylversatate copolymer(EMULTEX VV575) and the additive component used was DCA-4+ tablet. The finished tablet, weighing 1.462 grams on the average, is of 11 mm diameter and contains 26.8% by weight of EMULTEX VV575 copolymer solid. The test cooling solution was prepared by mixing equal volume of ethylene glycol and de-ionized water. It also contains potassium phosphate $K_2HPO_4$ at 2,000 mg/L concentration. The pH of the test solution was adjusted to 10.3 with sodium hydroxide.

Five coated tablets were stacked inside a polypropylene tube of 92 mm in length, and 14 mm in diameter. The tube, with one side open, has a total of 18 holes distributed evenly around the wall and one hole on the bottom of the tube. Each hole has a diameter of 4 mm.

The tube with the coated tablets was hung inside a 3-neck, 1-Liter, flask equipped with a magnetic stir bar and a cold-water condenser. Then, the flask was filled with 0.900 liters of test cooling solution.

Subsequently, with mixing, the solution was heated to, and kept at, 190±3 degrees F. The release of chemical ingredients from the DCA-4+ tablets into the solution was monitored. Samples were taken and analyzed for nitrite, nitrate and molybdate. The percent release with time for each ingredient was calculated as the ratio of measured concentration and expected concentration at full release. The results are shown as percent release with time in Table 2.

TABLE 2

| HOURS | NITRITE | NITRATE | MOLYBDATE |
| --- | --- | --- | --- |
| 43 | 0 | 0 | 0 |
| 90 | 11.4 | 11.3 | 8.9 |
| 162 | 14.0 | 14.2 | 10.2 |
| 215 | 21.3 | 21.1 | 18.1 |
| 258 | 29.1 | 29.1 | 25.1 |
| 330 | 41.7 | 40.2 | 31.5 |
| 402 | 53.1 | 55.6 | 41.1 |
| 498 | 70.3 | 62.9 | 59.8 |
| 598 | 77.8 | 79.6 | 62.9 |
| 666 | 89.7 | 94.0 | 72.0 |
| 763 | 94.4 | 95.8 | 76.6 |
| 835 | 101* | 105* | 81.0 |
| 931 | 105* | 104* | 87.2 |

*Release factor greater than 100% was due to statistical variations in concentration measurements.

As the data indicate, the ingredients were released gradually with time from the inner DCA-4+ tablet core into the outside test solution. An effective and substantially complete release was reached for nitrite and nitrate at approximately 800 hours, and for molybdate, expectedly, at approximately 1,100 hours.

Using the same flask protocol and conditions as described above, other cooling additive compositions were tested. Table 3 shows the slow release data (% release) for EMULEX VV575 at 22.3% coating on DCA-4+ tablets. Table 4 shows the slow release data (% release) for EMULEX VV575 at 18.2% coating on DCA-4+ tablets. Table 5 shows the slow release data (% release) for NeoCAR 820 (an acrylate-vinylversatate copolymer) at 30% coating on DCA-4+ tablets. Table 6 shows the slow release data (% release) for ETHOCEL S45 at 5% coating on DCA-4+ tablets. Table 7 shows the slow release data of ETHOCEL S45 at 15% coating on DCA-4+ tablets.

These data indicate that the ingredients were released gradually with time from the inner DCA-4+ tablet core into the outside test solution. Furthermore, as expected, the release rates for the additives are inversely proportional to the percentages of coating, i.e., coating by EMULEX VV575 at 26.8% (Table 2) has slower release rates of the additive components than at 22.3% (Table 3) and 18.2% (Table 4), respectively. Also, with the ETHOCEL polymer, the release rates for the additives are shown to be inversely proportional to the percentages of coating (Tables 6 and 7).

TABLE 3

| HOURS | NITRITE | NITRATE | MOLYBDATE |
| --- | --- | --- | --- |
| 43 | 0 | 0 | 0 |
| 90 | 9.9 | 9.4 | 8.0 |
| 162 | 19.8 | 22.3 | 17.2 |
| 215 | 43.6 | 46.5 | 38.3 |
| 258 | 49.4 | 49.8 | 39.2 |
| 330 | 69.2 | 72.3 | 59.5 |
| 402 | 91.3 | 91.5 | 75.8 |
| 498 | 102.0* | 98.3 | 80.9 |
| 598 | 99.1 | 99.1 | 83.4 |

*Release factor greater than 100% was due to statistical variations in concentration measurements.

TABLE 4

| HOURS | NITRITE | NITRATE | MOLYBDATE |
| --- | --- | --- | --- |
| 43 | 14.4 | 14.7 | 12.2 |
| 90 | 54.3 | 55.1 | 41.1 |
| 162 | 84.2 | 81.8 | 67.2 |
| 258 | 101* | 102* | 84.1 |

*Release factor greater than 100% was due to statistical variations in concentration measurements.

TABLE 5

| HOURS | NITRITE | NITRATE | MOLYBDATE |
| --- | --- | --- | --- |
| 43 | 0 | 0 | 0 |
| 90 | 0 | 0 | 0 |
| 162 | 0 | 2.4 | 0 |
| 215 | 0.7 | 3.5 | 2.2 |
| 258 | 8.7 | 9.6 | 8.3 |
| 330 | 10.6 | 11.8 | 9.8 |
| 402 | 12.2 | 13.1 | 11.2 |
| 498 | 22.5 | 21.8 | 21.0 |
| 598 | 28.5 | 29.0 | 25.4 |
| 666 | 30.6 | 30.1 | 27.1 |
| 788 | 34.9 | 34.9 | 31.3 |
| 835 | 36.0 | 41.9 | 35.4 |
| 931 | 38.0 | 43.9 | 36.0 |
| 1002 | 38.9 | 44.8 | 36.3 |

TABLE 6

| HOURS | NITRITE | NITRATE | MOLYBDATE |
| --- | --- | --- | --- |
| 66 | 62.6 | 57.0 | 41.2 |
| 162 | 76.5 | 67.5 | 48.1 |

TABLE 6-continued

| HOURS | NITRITE | NITRATE | MOLYBDATE |
|---|---|---|---|
| 216 | 81.3 | 73.9 | 53.3 |
| 429 | 86.1 | 79.2 | 56.4 |
| 525 | 90.0 | 82.5 | 58.1 |
| 602 | 92.7 | 85.8 | 61.2 |

TABLE 7

| HOURS | NITRITE | NITRATE | MOLYBDATE |
|---|---|---|---|
| 28 | 1.0 | 6.7 | 0 |
| 71 | 25.0 | 25.8 | 17.8 |
| 143 | 45.8 | 49.5 | 38.0 |
| 244 | 53.7 | 57.2 | 48.5 |
| 407 | 62.4 | 69.1 | 57.2 |
| 479 | 72.5 | 74.4 | 71.8 |
| 579 | 74.2 | 79.3 | 72.7 |
| 743 | 79.6 | 84.1 | 76.5 |
| 892 | 80.8 | 84.6 | 80.1 |
| 1012 | 88.8 | 90.6 | 83.3 |

EXAMPLE 2

Release Characteristics of a Controlled Release Cooling Additive Composition on a Rig In one embodiment, the additive compositions may be used in an engine cooling system. Therefore, the performance of the additive compositions were tested on a rig, which simulates an engine cooling system. For example, the performance of vinylacetate-vinylversatate (EMULTEX VV575), as a coating for DCA-4+ tablet, a cooling additive, was tested on a rig to simulate an engine cooling system. DCA-4+ tablets coated with 26.8% of EMULTEX VV575 were tested. The rig has three major components: a reservoir tank, a radiator and a pump. A heating element was installed inside the tank. In the experiment, a total of 18.4 liters of test cooling solution was added into the system. This system is similar to that of the one disclosed by Mitchell et al in U.S. Pat. No. 6,010,639, the disclosure of which is incorporated in its entirety by reference herein.

A Fleetguard WF2121 filter was used for the study. It contained a total of 187 pieces of coated DCA-4+ tablets inside the center tube of the filter.

After the filter was screwed onto the test rig between the reservoir and the radiator, the pump was started to begin the experiment as the test solution was circulated throughout the system. The flow rate of test solution through the filter was kept at about 1.2 to about 1.5 gallons per minute and the temperature of the bulk test solution was kept at about 190±5 degrees F. After every 10 days of running, the system was shut off for 12–48 hours before it was restarted.

Samples were collected with time, analyzed and the percent release of ingredients was calculated, similarly to the experiment in the flask above. Table 3 shows the percent release of the additives with time in a rig.

TABLE 8

| HOURS | NITRITE | NITRATE | MOLYBDATE |
|---|---|---|---|
| 43 | 0.5 | 2.1 | 1.2 |
| 90 | 1.6 | 2.1 | 1.9 |
| 162 | 4.2 | 4.9 | 3.7 |

TABLE 8-continued

| HOURS | NITRITE | NITRATE | MOLYBDATE |
|---|---|---|---|
| 215 | 6.1 | 6.2 | 5.2 |
| 260 | 7.8 | 7.6 | 6.5 |
| 354 | 12.3 | 11.6 | 9.4 |
| 402 | 13.2 | 12.9 | 10.0 |
| 498 | 16.0 | 13.7 | 12.1 |
| 598 | 18.7 | 16.1 | 14.4 |
| 666 | 20.2 | 18.3 | 15.4 |
| 714 | 23.9 | 21.3 | 18.4 |
| 790 | 26.3 | 27.2 | 21.2 |
| 835 | 31.9 | 31.6 | 26.2 |
| 931 | 35.2 | 37.1 | 29.7 |
| 1000 | 43.3 | 44.1 | 35.2 |
| 1100 | 56.3 | 58.1 | 47.5 |
| 1192 | 69.8 | 74.1 | 57.6 |
| 1290 | 77.0 | 82.1 | 64.7 |
| 1390 | 82.0 | 82.4 | 67.7 |
| 1552 | 84.1 | 84.4 | 69.8 |
| 1720 | 89.4 | 95.0 | 75.0 |
| 1985 | 92.3 | 95.3 | 75.3 |

Again, as the data demonstrate, the ingredients were released gradually from the inner DCA-4+ tablet core into the outside test cooling solution. The release rate was significantly slower for every ingredient compared to that from the experiment in the flask.

The following example provides those of ordinary skill in the art with specific methods to produce the controlled release cooling additive composition within the scope of the present invention and is not intended to limit the scope of the invention.

EXAMPLE 3

Method for Making the Controlled Release Cooling Additive Composition

Fleetguard DCA-4+ tablets were used. They are composed of nitrite, nitrate, phosphate, silicate, borate, molybdate, tolyltriazole, organic acid, scale inhibitors, surfactants and defoamers. The powdery ingredients were mixed first, then pressed into standard-cup tablets using ⅜" tooling. The tablets were of about 1.10 grams in weight and about 8 to about 15 kps in hardness. The Drum Coater was used for coating.

For coating the DCA-4+ tablets, the DCA-4+ standard-cup tablets were placed onto the rotating pan inside the drum coater. While the pan was being rotated, EMULTEX VV575 dispersion was pumped and sprayed through a nozzle onto the tablet surface. The spray rate is important. It was maintained at about 15 grams of dispersion per minute. The spray pattern was controlled to give a good mist of polymer droplets.

At the same time, through a very slightly reduced pressure, a stream of warm air of about 40 degrees C. was passed through the coating chamber to remove the water vapor from the polymer mist (or small droplets), before and after they reached the tablet surface.

With time, the polymer gradually formed a layer of coating on the tablet. After all polymer dispersion was sprayed to reach the desired thickness of coating, the resulting coated tablets were allowed to stay on the rotating pan for a few more minutes, then were decanted from the pan into container for storage.

While this invention has been described with respect to various specific examples and embodiments, it is to be understood that the invention is not limited thereto and that it can be variously practiced with the scope of the following claims.

What is claimed is:

1. A controlled release additive composition for use in an open circulating cooling water system, the composition comprising:
   a solid, granular, or particulate core comprising an additive component effective as a water treatment in an aqueous coolant of an open circulating cooling water system; and
   a coating substantially surrounding the core and effective to slow the release of the additive component into an aqueous coolant in the open circulating cooling water system, the coating being insoluble in the aqueous coolant in the open circulating cooling water system, and including a copolymer including units obtained from only two different monomers, one of the two monomers being vinylversatate.

2. The controlled release additive composition of claim 1, wherein the copolymer includes units from vinylacetate.

3. The controlled release additive composition of claim 1, wherein the copolymer includes about 45% to about 95% by weight of units obtained from one of the monomers and about 5% to about 55% by weight of units obtained from vinylversatate.

4. The controlled release additive composition of claim 1, wherein the coating is about 1% to about 40% based on the total weight of the composition.

5. The controlled release additive composition of claim 1, wherein said additive component includes a microbiocide effective in the open circulating cooling water system.

6. A controlled release additive composition for use in an open circulating cooling water system comprising:
   a solid, granular, or particulate core comprising an additive component effective as a water treatment in an open circulating cooling water system; and
   a coating substantially surrounding the core and effective to slow the release of the additive component into the open circulating cooling water system, the coating being insoluble in the open circulating cooling water system and including a copolymer made up of about 45% to about 95% by weight of units which are from vinylacetate and about 5% to about 55% by weight of units which are from vinylversatate.

7. The controlled release additive composition of claim 6, wherein the weight percent of the coating is about 1% to about 40% based on the total weight of the controlled release additive composition.

8. The controlled release additive composition of claim 6, wherein the weight percent of the coating is about 3% to about 15% based on the total weight of the controlled release additive composition.

9. The controlled release additive composition of claim 6, wherein the weight percent of the coating is about 4% to about 10% based on the total weight of the controlled release additive composition.

10. The controlled release additive composition of claim 6, wherein said core further comprises an amount of a binder sufficient to maintain said core in the form of a tablet or pellet.

11. The controlled release additive composition of claim 6, wherein said core further comprises a die release agent.

12. A method of releasing an additive composition into an open circulating cooling water system comprising placing the controlled release additive composition of claim 6 in contact with an aqueous coolant present in an open circulating cooling water system.

13. The controlled release additive composition of claim 6, wherein the core includes a microbiocide.

14. A method of releasing an additive composition into an open circulating cooling water system comprising placing a controlled release additive composition in contact with an aqueous coolant present in an open circulating cooling water system, the controlled release additive composition comprising
   a core comprising an additive component effective as a water treatment in an aqueous coolant of an open circulating cooling water system; and
   a coating substantially surrounding the core and effective to slow the release of the additive component into an aqueous coolant in the open circulating cooling water system, the coating being insoluble in the aqueous coolant in the open circulating cooling water system, and including a copolymer including units obtained from only two different monomers, one of the two monomers being vinylversatate.

15. A method of releasing an additive composition into an open circulating cooling water system of a cooling tower comprising
   placing a controlled release additive composition in contact with an aqueous coolant present in an open circulating cooling water system of a cooling tower, the controlled release additive composition comprising
   a core comprising an additive component effective as a water treatment in an aqueous coolant of the open circulating cooling water system of the cooling tower; and
   a coating substantially surrounding the core and effective to slow the release of the additive component into the aqueous coolant in the open circulating cooling water system, the coating being insoluble in the aqueous coolant in the open circulating cooling water system of the cooling tower, and including a copolymer made up of about 45% to about 95% by weight of units which are from vinylacetate and about 5% to about 55% by weight of units which are from vinylversatate.

16. The method of claim 15, further comprising adding a microbiocide to the additive component of the core before placing the controlled release additive composition in the open circulating cooling water system.

17. A method of releasing an additive composition into an open circulating cooling water system of a cooling tower comprising:
   placing a controlled release additive composition in contact with an aqueous coolant present in an open circulating cooling water system of a cooling tower, the controlled release additive composition comprising a core comprising an additive component effective as a water treatment in an aqueous coolant of the open circulating cooling water system of the cooling tower; and a coating substantially surrounding the core and effective to slow the release of the additive component into the aqueous coolant in the open circulating cooling water system, the coating being insoluble in the aqueous coolant in the open circulating cooling water system of the cooling tower and including a copolymer made up of about 45% to about 95% by weight of units which are from vinylacetate and about 5% to about 55% by weight of units which are from vinylversatate; and
   adding a microbiocide to the open circulating cooling water system of the cooling tower.

18. The method of claim 17, wherein the microbiocide is added to the open circulating cooling water system with the controlled release additive composition.

19. The method of claim 17, wherein the coating of the composition is insoluble over a temperature range of about 70 degrees Fahrenheit to about 150 degrees Fahrenheit.

* * * * *